April 30, 1957 — P. C. CAMERON — 2,790,350
ANTI-GLARE MIRROR
Filed Aug. 14, 1952
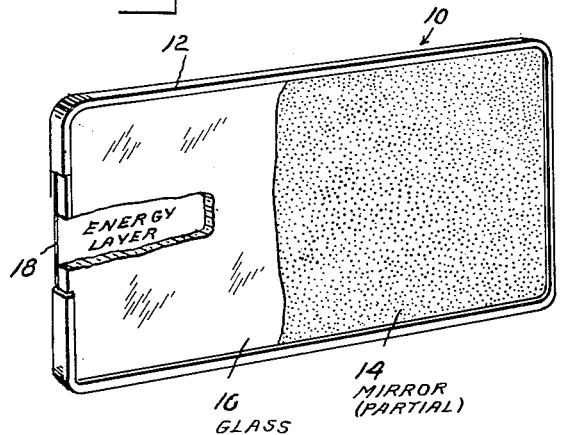
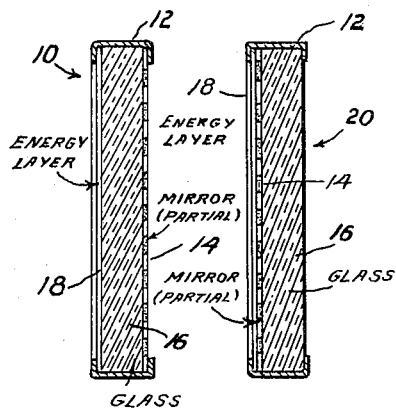
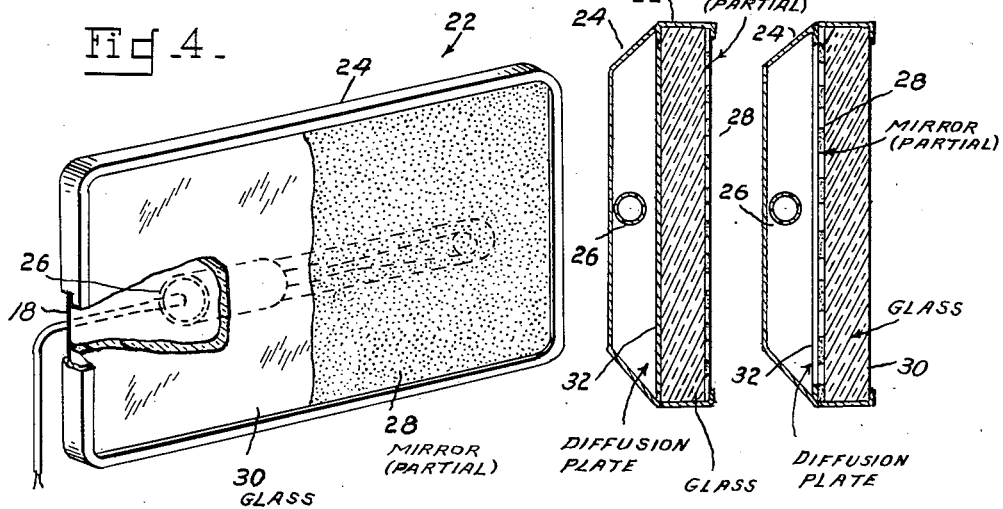
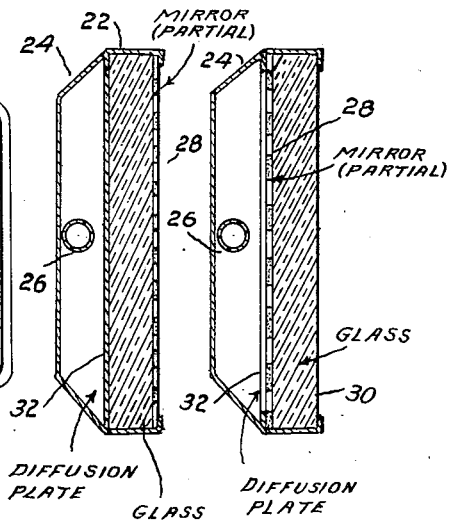
INVENTOR·
Peter C. Cameron,
BY
ATTORNEY

United States Patent Office 2,790,350
Patented Apr. 30, 1957

2,790,350

ANTI-GLARE MIRROR

Peter C. Cameron, Bethesda, Md., assignor, by mesne assignments, of one-tenth to Richard P. Schulze, Bethesda, Md.

Application August 14, 1952, Serial No. 304,399

2 Claims. (Cl. 88—77)

This invention relates to improvements in anti-glare mirrors and in a preferred embodiment thereof is concerned with improvements in rear view mirrors particularly adapted for vehicles.

Many attempts have been made to provide anti-glare or glare reducing mirrors to eliminate a portion at least of the glare of a following vehicle whereby to enhance the safety and comfort of night vehicle driving. In effecting such glare reductions, however, these attempts have invariably also reduced the reflective function of the mirror so that what has been gained in one respect has been lost in another.

Certain of such unsuccessful prior attempts satisfactorily to solve the problem have involved the use of partially silvered or reflective mirrors with means to absorb the light rays which penetrate the non-reflective portions of the mirror body. Devices of this type, however, still produce an objectionable glare from the reflective portions thereof thus indicating that absorption of a portion of the light rays does not provide an adequate answer to the problem.

It is the principal object of the present invention to avoid the foregoing disadvantages attendant upon prior devices and to provide a true anti-glare mirror comfortable to the vision of the user and in which the reflected image is unimpaired.

More particularly, the invention contemplates the provision of an anti-glare viewing device characterized by the combination with a partially silvered reflecting surface of a source of light, either direct or reradiated, which is visible through the reflecting surface along with the reflected image.

The foregoing and other objects and advantages of the invention will be apparent from the following detailed description taken in conjunction with the accompanying drawings wherein preferred embodiments of the principles of the invention have been selected for exemplification.

In the drawings:

Fig. 1 is a perspective view of one form of anti-glare mirror constructed in accordance with the invention partially broken away to show the various effective layers thereof including an energy layer;

Fig. 2 is a vertical sectional view of the device shown in Fig. 1;

Fig. 3 is a view similar to Fig. 2 but showing a modification wherein the partial mirror means is carried on the opposed surface of the body;

Fig. 4 is a perspective view of another form of the invention wherein the energy layer is replaced by an electric lamp for connection with a source of energizing electric current;

Fig. 5 is a vertical sectional view of the device shown in Fig. 4; and

Fig. 6 is a view similar to Fig. 5 but showing a modification wherein the partial mirror means is carried on the opposed surface of the body.

Referring more particularly to the drawings, wherein like numerals refer to like parts, one form of the invention is indicated at 10 in Figs. 1 and 2 wherein an anti-glare mirror, suitable as a rear view mirror for vehicles, is composed of a frame or the like 12 supporting a front layer 14 having a partially silvered or other similar image reflecting surface, an intermediate body layer of glass or the like 16 and a source of light in the form of a rear energy layer or coating 18 comprising a body of phosphorescent or other luminescent material. The coating 18 is adapted to be energized by light which passes through the interstices of the discrete reflective particles carried by the front layer 14 and provides a mat background for the specularly reflected image. The reradiation of light by the phosphorescent body 18 through the front reflective layer 14 has the phenomenal effect of providing an eye comfortable image substantially entirely devoid of glare when the bright headlights of a following vehicle are directed toward the viewing device 10 when positioned on a forward vehicle and reflected in the eyes of the operator thereof. The light reradiated by the layer of phosphorescent material 18 thus provides a luminous mate background for the specular image of the headlights formed by the partially silvered reflecting surface 14 whereby to reduce the contrast between the bright image of the headlight and the background which in the absence of the phosphorescent material would be completely dark. The ocular effect of this reduction of contrast is a very substantial diminution or entire elimination of the sensation of glare.

The various layers need not be arranged in the particular order shown in Figs. 1 and 2. Equally as satisfactory results are obtained with the arrangement shown at 20 in Fig. 3 wherein the transparent body 16 is the front layer and the partially silvered or other similar image reflecting surface 14 is disposed intermediate the front layer and the rear phosphorescent or light energy storing layer 18.

In the modified form of the invention shown in Figs. 4 and 5, the phosphorescent or other energy reradiative layer may be replaced by a direct source of light in the form of an electric light source connected, preferably through an intensity regulating rheostat, with a source of electric current commonly as provided on vehicles, or otherwise. In this alternative construction, the unit designated at 22, comprises a casing or shell 24 for receiving a source of electric light 26, preferably in the form of an elongated envelope, and having a flanged opening in which are positioned the partially silvered or other similar reflecting front layer 28, the glass or other transparent body layer 30 and, preferably, a diffusion plate 32 of ground glass or the like to promote more effective distribution of the light from the source 26.

As in the first form of the invention, the order of the various layers as shown in Figs. 4 and 5 is not critical and may be varied, for example, as shown in Fig. 6 wherein the glass or transparent body 30 is in front and the partially silvered or other similar reflecting layer or surface is disposed intermediate the body layer and the diffusion plate 32. Also, the light source 26 may be positioned to edge light or otherwise contribute its cooperative function instead of being positioned directly at the rear of the device in the particular manner shown.

In all forms of the invention, the intensity of the light source and the degree of reflectivity may be relatively varied to suit particular conditions, it being generally the optimum consideration to provide the greatest degree of reflectivity consistent with adequate diminution or substantially complete elimination of the sensation of glare.

An incidental advantage of the invention is the comfortable and pleasing sensation afforded the operator of the vehicle by the mild light glow which normally emanates from the attached device during night driving conditions which has the further effect of conditioning to a degree the eyes of the operator against any sudden exposure to light of ordinarily blinding intensity.

It will be understood that the particular form of devices herein illustrated and described are merely exemplary of the principles of the invention which embrace the broad concept of any physical embodiment within the scope of the following claims.

I claim:

1. An anti-glare rear view mirror for vehicles which comprises, a mirrored viewing surface which is partially reflective and partially transparent and a continuous layer of luminescent material at the rear of and coextensive with said viewing surface, the said luminescent material being adapted to be energized by light, such as from the headlights of a following vehicle, passing through said viewing surface whereby to provide a reradiated luminous mat background for the image specularly reflected from the reflective portion of said viewing surface.

2. An anti-glare rear view mirror for vehicles which comprises, a mirrored viewing surface which is partially reflective and partially transparent and a continuous luminous phosphorescent coating at the rear of and coextensive with said viewing surface, the said luminous phosphorescent coating being adapted to be energized by light, such as from the headlights of a following vehicle, passing through said viewing surface whereby to provide a reradiated luminous mat background for the image specularly reflective from the reflected portion of said viewing surface.

References Cited in the file of this patent

UNITED STATES PATENTS

| | | |
|---|---|---|
| 1,457,565 | Warrick | June 5, 1925 |
| 1,847,134 | Nikonow | Mar. 1, 1932 |
| 2,295,268 | Pellegrin et al. | Sept. 8, 1942 |
| 2,439,181 | Nicoli | Apr. 6, 1948 |
| 2,595,331 | Calihan et al. | May 6, 1952 |
| 2,600,751 | Gazda | June 17, 1952 |
| 2,625,852 | Van Orden | Jan. 20, 1953 |
| 2,629,087 | Ross | Feb. 17, 1953 |